Oct. 30, 1956 G. H. HARE ET AL 2,769,093

RADIO FREQUENCY MASS SPECTROMETER

Filed Sept. 8, 1953 4 Sheets-Sheet 1

INVENTORS.
GEORGE H. HARE
DAVID R. MARGETTS
BY THEIR ATTORNEYS.
HARRIS, KIECH, FOSTER & HARRIS

INVENTORS.
GEORGE H. HARE
DAVID R. MARGETTS
BY THEIR ATTORNEYS.
HARRIS, KIECH, FOSTER & HARRIS

INVENTORS.
GEORGE H. HARE
DAVID R. MARGETTS
BY THEIR ATTORNEYS.
HARRIS, KIECH, FOSTER & HARRIS

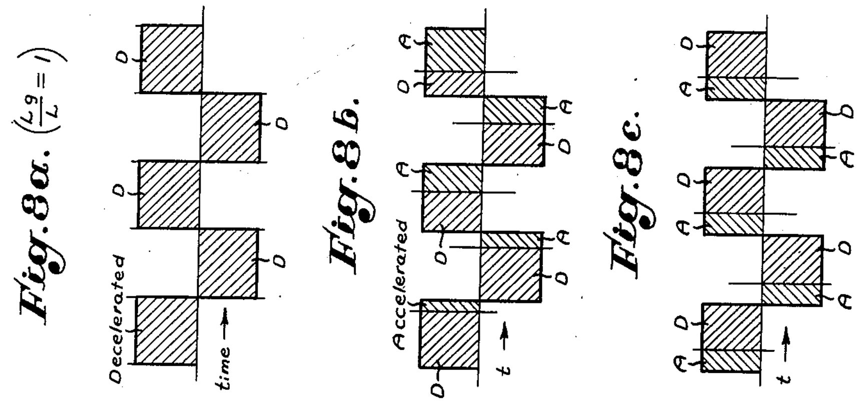
Fig. 8a. $\left(\frac{Lg}{L}=1\right)$ Fig. 8b. Fig. 8c.
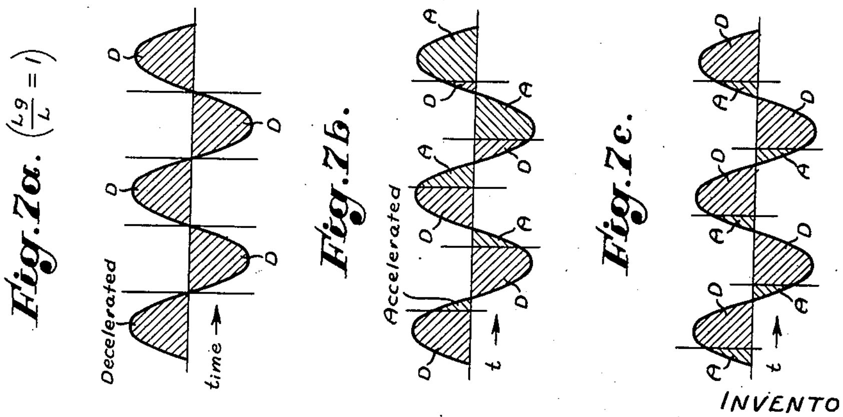
Fig. 7a. $\left(\frac{Lg}{L}=1\right)$ Fig. 7b. Fig. 7c.
INVENTORS.
GEORGE H. HARE
DAVID R. MARGETTS
BY THEIR ATTORNEYS.
HARRIS, KIECH, FOSTER & HARRIS

United States Patent Office 2,769,093

Patented Oct. 30, 1956

2,769,093

RADIO FREQUENCY MASS SPECTROMETER

George H. Hare and David R. Margetts, Pasadena, Calif., assignors to Beckman Instruments, Inc., South Pasadena, Calif., a corporation of California Application September 8, 1953, Serial No. 378,756

37 Claims. (Cl. 250—41.9)

The present invention relates in general to the mass analysis of materials and, more particularly, to a radio frequency mass spectrometer for particle-mass analysis.

In general, the radio frequency mass spectrometer of the invention provides charged particles of different masses with kinetic energies or energy levels which are related to the masses of the respective particles, whereby those particles of a predetermined or selected mass are provided with an optimum energy level. The charged particles having the optimum energy level are collected in a collecting system which produces a signal capable of being utilized for an indicating function, for control, for recording, or for any other suitable function. More particularly, the radio frequency mass spectrometer of the invention ionizes a substance to be analyzed and provides the ions of a predetermined or selected mass with an optimum kinetic energy level, whereby the relative abundance of the ions of selected mass derived from the sample substance may be determined. By scanning the mass spectrum, i. e., by making, in turn, each of the ion masses within a selected mass range the selected mass, the proportional abundance of each of the ions of different masses derived from the sample substance may be determined, whereby a qualitative and quantitative analysis of the sample can be made.

Preferably, the mass spectrometer comprises a tube having an evacuated envelope into one end of which the sample substance, for example a gas mixture, may be introduced at a very low pressure, the tube also including ionizing means for ionizing the sample. The resulting ions pass into an analyzer within the envelope which includes a plurality of electrodes having direct and alternating potentials applied thereto in such a manner as to selectively vary the kinetic energy levels of the ions according to their masses, ions of one particular, predetermined mass being provided with the optimum energy level. From the analyzer, the selectively energized ions pass to the collecting system mentioned, only the ions of selected mass having the proper energy to enable them to arrive at a collecting means, such as a charged plate or electrode. As hereinbefore suggested, the resulting ion current or signal may appear on a suitable indicating or recording means, or it may be utilized by a control means performing a suitable control function, or the like.

The fundamental object of the present invention is to provide a spectrometric method and apparatus of the foregoing general nature wherein the kinetic energy level of the ions of the predetermined mass is brought to an optimum value which is a minimum, rather than a maximum as in certain other mass spectrometers.

More specifically, a primary object of the invention is to provide a method and apparatus for selectively decelerating ions of different masses in a beam of such ions according to the respective masses thereof so as to provide those ions of the predetermined mass with a minimum kinetic energy level, the ions having the minimum energy level subsequently being collected in a collecting system which produces an ion current or signal for indicating, recording, or control purposes, or the like.

Still more particularly, an object of the invention is to provide a mass spectrometer having an analyzer or analyzer means provided with accelerating and decelerating sections, the ions emanating from the ionizing means initially being accelerated in the accelerating section of the analyzer to different velocities in accordance with their masses, and subsequently being selectively decelerated in the decelerating section of the analyzer in such a manner that ions of the selected mass have their kinetic energy level reduced to a minimum. Preferably, the accelerating section of the analyzer has D. C. potentials applied thereto, although A. C. potentials may be utilized in some instances, while the decelerating section of the analyzer is preferably a radio frequency A. C. section.

Selectively decelerating the ions in the radio frequency section of the analyzer in accordance with the present invention has several advantages over selectively accelerating the ions in such an analyzer section. For example, since the ions are selectively decelerated instead of being selectively accelerated therein, higher accelerating voltages are employed in the initial accelerating section for given conditions of final ion energy and mass resolution at the collector. One result of the use of such higher accelerating voltages is better focusing of the ion beam.

Another advantage of the deceleration system over an acceleration system is that one terminal of the current indicator and one set of plates of the R. F. analyzer section may conveniently be connected to a common ground potential point. This means that the R. F. structure (i. e., one set of its electrodes) can be attached to a grounded metal envelope without the use of insulators in the electrode support structure, the metal envelope being conveniently at ground potential. At the same time the current indicator can be operated with one side grounded, which is desirable for two reasons, viz., shielding against stray fields is facilitated, and there is no necessity of guarding against shock to the operator or guarding against capacity coupling, through the operator, to ground. In an accelerating system, on the other hand, the current indicator and the R. F. electrode structure are separated by a D. C. potential of perhaps thousands of volts.

Another advantage of selectively decelerating the ions in the radio frequency section of the analyzer arises from the fact that, in any ion-optical device, it is desirable to keep the space charge density in the region of an ion beam as low as possible. A beam of charged particles flowing through a region of space sets up a space charge density $$P=\frac{j}{v}$$

where $j$ is the current density and $v$ is the velocity of the particles. It is desired to keep the charge density P as small as possible in all ion-optical devices since a high P distorts the electric fields otherwise defined by the field elements and also causes spreading of ion beams. This spreading normal to the direction of ion flow is a function of M, mass number, and increases with the mass number of the ions. A greater fraction of heavy ions is therefore lost on the walls of the R. F. electrodes than of light ions. This mass-selective attenuation can cause errors, in relative peak heights on the mass spectrum, of several percent at the higher current levels which it may be desirable to employ. Keeping the average ion velocity as high as possible keeps the charge density everywhere as low as possible.

Since, for many samples analyzed, most of the current in the radio frequency section of the analyzer and in the collecting system arises from ions of masses other than the selected mass, the average ion velocity resulting from decelerating the ions in the radio frequency section is higher than it would be if the ions were selectively accelerated therein because of the fact that only the ions of the selected mass are decelerated to a minimum kinetic energy level. Thus, the desired high average ion velocity and resulting low space charge density are obtained by selectively decelerating the ions in the radio frequency analyzer section, as compared to the case wherein the ions are selectively accelerated in the radio frequency section. In an acceleration system, the average ion velocity, relatively speaking, is low and the space charge density is high because of the fact that only the ions of the preferred mass, or very nearly the preferred mass, attain high velocities, the other, nonpreferred ions, which ordinarily represent most of the ions present, having much lower velocities in an acceleration system, thereby considerably reducing the average ion velocity.

Still another advantage of the deceleration system of the present invention, i. e., of selectively decelerating the ions in the radio frequency analyzer section, is that, in the collecting system, the preferred, minimum energy section of the ion beam may be easily caused to swing clear of all structural elements except the collecting electrode. The preferred portion of the ion beam emerging from the radio frequency analyzer section may then be made incident upon a collecting electrode which is subject to less exacting positional and geometrical requirements than is the case for a corresponding collecting electrode in an acceleration system wherein the ions of the preferred mass have maximum energy. The foregoing considerations furthermore facilitate the design of a collecting system which suppresses emission of secondary electrons and/or positive and negative secondary ions from the collecting electrode, since the design may be made independent of otherwise restricting geometrical requirements.

Keeping in mind the preceding discussion of the advantageous effect of selectively decelerating the ions in the radio frequency analyzer section on the collecting system of the mass spectrometer, an important object of the invention is to provide an electrostatic-deflection collecting system which provides the ions of different masses and correspondingly different energy levels with correspondingly different trajectories, an intercepting electrode or plate being located in the collecting system at a selected energy locus to intercept all ion trajectories except the trajectory of the ions of the selected mass. Thus, as hereinbefore indicated, the preferred trajectory, i. e., the trajectory of the ions of the preferred mass, swings clear of all components of the collecting system except the electrode for collecting the ions of the preferred mass, which is an important feature.

Another object of the invention is to provide a radio frequency analzyer section which includes a linear array of electrodes spaced to provide a series of deceleration stages of progressively diminishing length along the ion path according to the progressively decreasing velocity of the ions of the selected mass, an alternating potential source being connected to the electrodes in such a manner as to provide adjacent electrodes in the array with alternatingly opposite polarities so that the ions of the preferred mass are subjected to deceleration in each interelectrode gap or space. Electrodes of any of a variety of types may be used in the radio frequency analyzer section, examples being tubular electrodes, apertured plates, grids, or the like.

An important object of the invention is to provide a radio frequency analyzer section wherein the energy lost by ions of the predetermined mass at each interelectrode gap or space is constant throughout the entire section. This is insured not only by progressively decreasing the stage lengths, as mentioned, but by decreasing the lengths of the decelerating fields at the interelectrode gaps from the upstream end of the radio frequency analyzer section toward the downstream end thereof in such a way that each particle of the predetermined mass is exposed to a geometrically similar decelerating field for the same length of time in each interelectrode gap. The lengths of the decelerating fields are progressively decreased by progressively decreasing the electrode spacing, and/or, in certain cases, selected lateral dimensions, according to the progressively decreasing velocity of the ions of the selected mass.

Another important object is to provide a radio frequency analyzer section in which the transit time from one interelectrode gap to the next is constant throughout the entire section for particles of the predetermined mass.

While the mass spectrometer of the invention may be used with an alternating potential of sine waveform applied to the electrodes of the radio frequency analyzer section, an important object of the invention is to apply to such electrodes an alternating potential of a different waveform, such as a square waveform or a pulse-type waveform, the square waveform in particular having the advantage of providing superior signal current output, while the pulse-type waveform in conjunction with a suitable R. F. analyzer structure provides superior resolution.

Another object of the invention is to provide for scanning the mass spectrum, i. e., for making successive ion masses the preferred ion mass, by varying the frequency and/or amplitude of the alternating waveform applied to the electrodes of the radio frequency analyzer section.

Still another object is to frequency modulate the radio frequency in the analyzer section to decrease the sharpness of the mass peaks so as to reduce the rapidity of response required of the indicating means.

Another object of the invention is to provide a gas leak for introducing a gaseous sample substance to be analyzed into the mass spectrometer, the gas leak comprising, for example, means for metering a gaseous substance to the ionizing means from a region of higher pressure.

The foregoing objects and advantages of the present invention, together with various other objects and advantages thereof which will become apparent, may be attained with the exemplary embodiments of the invention illustrated in the accompanying drawings and described in detail hereinafter. Referring to the drawings.

Figure 1:
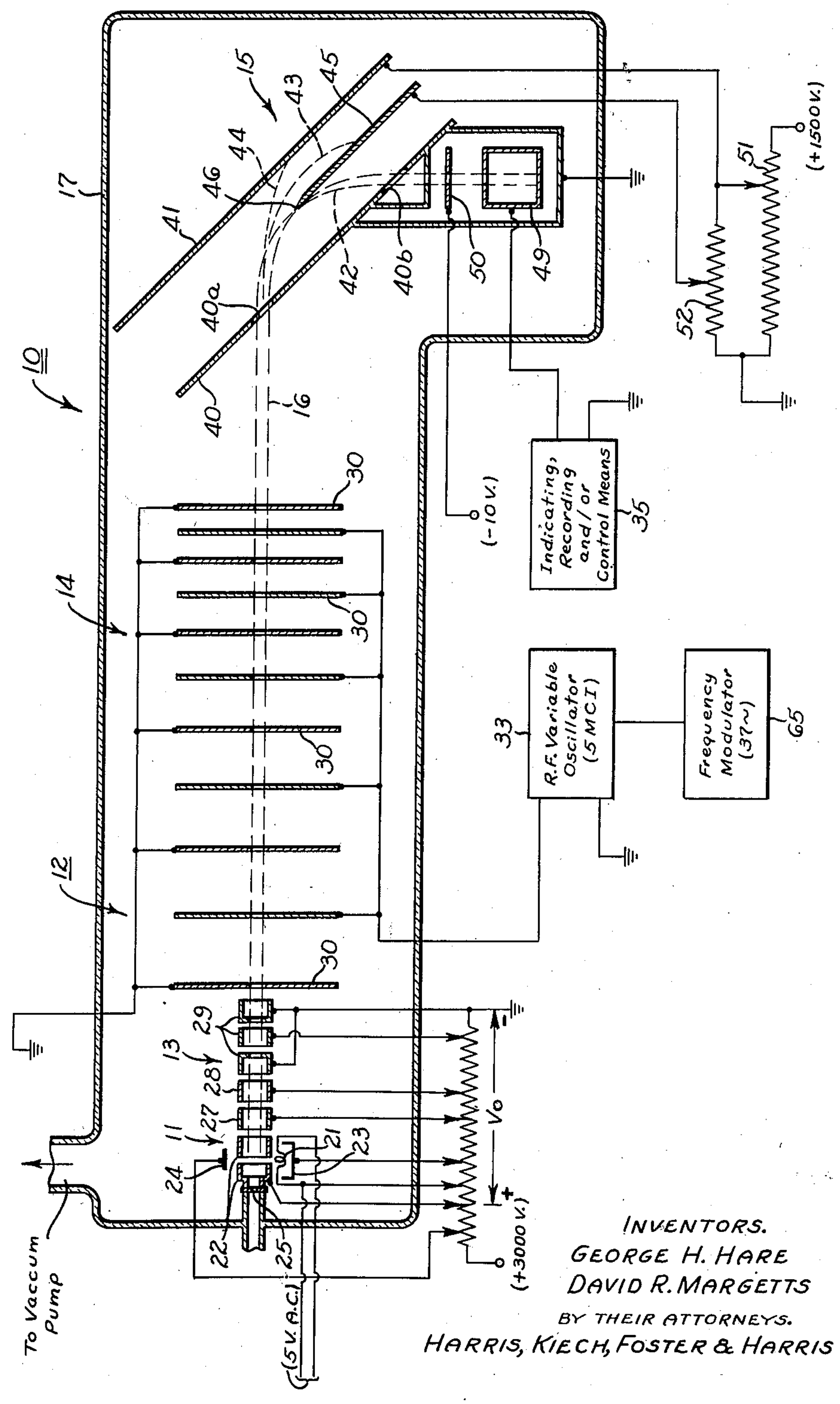
Fig. 1 is a diagrammatic view of a radio frequency mass spectrometer of the invention which incorporates one embodiment of a radio frequency A. C. analyzer section of the invention.
Figure 2:
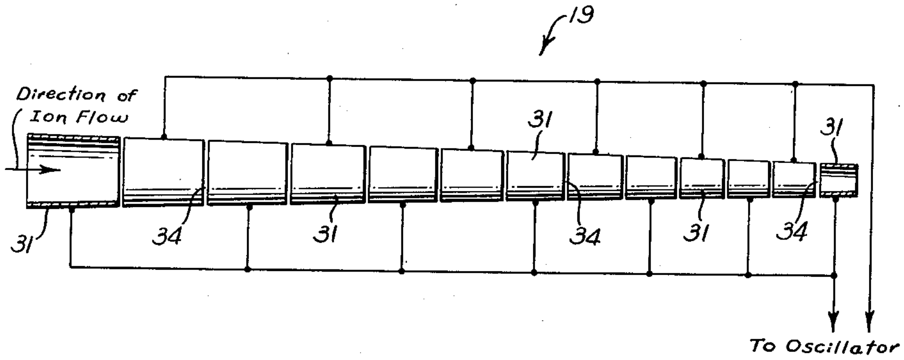
Fig. 2 is a diagrammatic view of another embodiment of a radio frequency A. C. analyzer section of the invention.
Figures 4A, 4B, 4C, 5A, 5B, 5C, 6A, 6B, 6C:
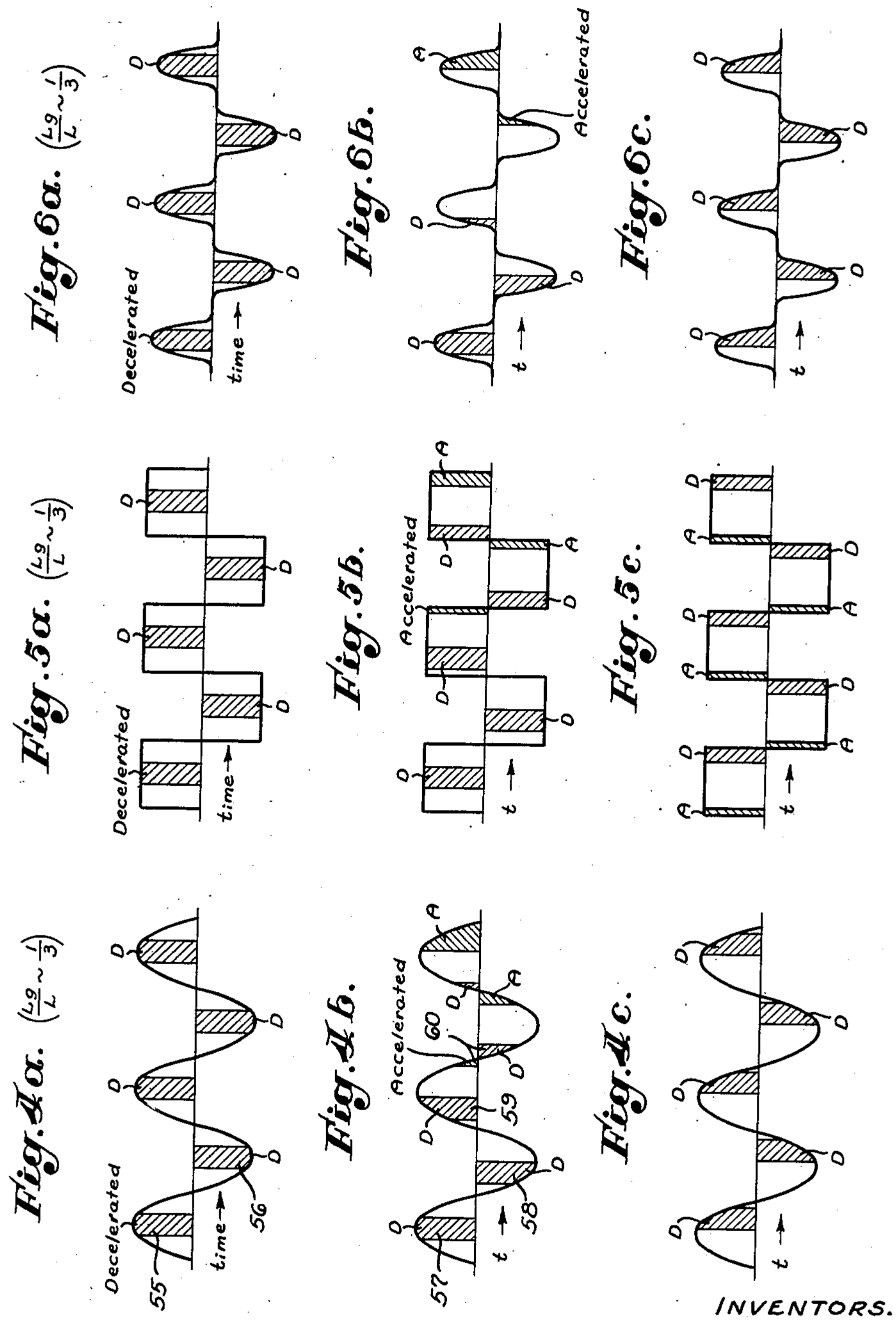

Figs. 4*a* to 4*c* are diagrammatic views illustrating the operation of the analyzer section of Fig. 2 with an alternating potential of sine waveform applied thereto;

Figs. 5*a* to 5*c* are diagrammatic views illustrating the operation of the analyzer section of Fig. 2 with an alternating potential of square waveform applied thereto;

Figs. 6*a* to 6*c* are diagrammatic views illustrating the operation of the analyzer section of Fig. 2 with a pulse-type alternating potential applied thereto;

Figs. 7*a* to 7*c* are diagrammatic views illustrating the operation of the radio frequency analyzer section of Fig. 1 with an alternating potential of sine waveform applied thereto; and, Figs. 8*a* to 8*c* are diagrammatic views illustrating the operation of the radio frequency analyzer section of Fig. 1 with an alternating potential of square waveform applied thereto.

Referring to Fig. 1 of the drawings, illustrated therein is a radio frequency mass spectrometer tube 10 of the invention which includes an ionizing means or ion source 11, an analyzer 12 having an accelerating section 13 and a decelerating section 14, and a collecting system 15. Preferably, the accelerating analyzer section 13, also referred to hereinafter as an ion-beam focusing means, is energized by D. C. potentials applied thereto, while the decelerating section 14 is energized by A. C. potentials, preferably of radio frequency. The ionizing means 11 and the collecting system 15 are disposed at the upstream and downstream ends, respectively, of an ion path 15 with the analyzer 12 therebetween. The foregoing elements or components are disposed in an envelope 17 of any suitable material which is continuously evacuated by any suitable means, the evacuating means not being shown since such devices are well known.

The radio frequency analyzer section which is illustrated in Fig. 2 of the drawings and which is designated generally by the numeral 19 therein may be substituted for the radio frequency analyzer section 14, the structures and modes of the operation of both being discussed in detail hereinafter.

Considering the ionizing means 11, it includes a cathode 21 for producing electrons, the latter being accelerated in their approach to a more or less closed ionization chamber 22 in which ionization takes place. A filament shield 23 more or less encloses the cathode 21 to keep electrodes from reaching elements other than the ionization chamber 22, and a potential between an electron collector 24 and the ionization chamber keeps secondary electrons formed at the collector 24 out of the ionization chamber 22.

In order to ionize a sample gas mixture, a small quantity of the mixture is introduced into the evacuated envelope 17 of the tube 10 in the vicinity of the ionization chamber 22 so that ionization of the gas mixture takes place in this region as collisions occur between the accelerated electrons and the gas molecules. Preferably, the gas mixture enters into the ionization chamber 22 through a gas leak 25 by means of which introduction of the sample may be accurately controlled.

Accordingly, the elements thus far described serve as means for producing ions of the material to be analyzed, the material being a gas in the particular application of the invention under consideration. However, it will be understood that other ion sources may be employed with other sample substances if desired and the invention is not to be regarded as limited to the particular ion source shown.

The ions formed in the ionization chamber 22 are accelerated and focused down the ion path 16 by the analyzer section 13, shown as comprising structures 27, 28 and 29 to which are applied accelerating potentials. Fig. 1 of the drawings illustrates these elements as having D. C. accelerating potentials applied thereto. It will be understood that the external connections shown for the various components of the ionizing means 11 and the analyzer section 13 are illustrative only, as is the corresponding D. C. potential designated on Fig. 1 of the drawings.

Thus, ions produced by the ionizing means 11 are accelerated by the analyzer section 13 and are focused thereby into an ion beam which then enters the decelerating analyzer section 14, or the decelerating analyzer section 19. The total D. C. potential through which the ions fall in the analyzer section 13 may be designated by the symbol $V_0$, this D. C. accelerating potential establishing a spread of ion velocities, according to mass, in the ion beam leaving the analyzer section 13. However, since the same accelerating potential is applied to all of the ions irrespective of mass, the ions in the ion beam leaving the analyzer section 13 of course all have the same kinetic energy, assuming that certain secondary effects, such as initial random thermal energy, are negligible and that all ions under consideration carry an equal charge. Changing one or more of the focusing voltages applied to the structures 27 to 29 does not change the velocity disposition of the particles in the beam emanating from the analyzer section 13, but only their focus and space disposition. The total D. C. accelerating potential, $V_0$, is however, made relatively large to obtain a relatively large velocity spread. Large values of $V_0$ result also in relatively high ion velocities so that the average ion velocity throughout the decelerating analyzer section 14 and the collecting system 15 is made as high as possible and the space charge density everywhere as low as possible for reasons hereinbefore discussed. Actually, either positive or negative ions may be accelerated into the analyzer section 14 by the analyzer section 13 and the discussion which follows will be based on positive ions as a matter of convenience, it being obvious that negative ions may be handled by reversing polarities as required.

The decelerating analyzer section 14 includes an array, preferably a linear array, of electrodes 30 spaced apart along the ion path 16, the electrodes 30 being apertured plates, preferably discs. Similarly, the decelerating analyzer section 19 illustrated in Fig. 2 of the drawings includes a linear array of electrodes 31 spaced apart along the ion path 16, the electrodes 31 being axially aligned tubes in the particular construction illustrated. Alternate individual electrodes 30 are electrically interconnected as shown, the two groups of electrodes being connected to a suitable source of alternating potential, preferably of radio frequency, in such a manner that adjacent electrodes are of opposite polarity at any given instant. In other words, adjacent electrodes 30 in the linear array are provided with alternatingly opposite polarities. This may be accomplished by connecting the two groups of electrodes 30 across the output terminals of an oscillator 33 as illustrated in Fig. 1 of the drawings. The tubular electrodes 31 are also connected to a suitable source of alternating potential such as an oscillator, in the same manner, so that adjacent individual electrodes 31 are similarly provided with alternatingly opposite polarities.

Irrespective of the type of the electrodes, they form a repetitive structure to provide a series of deceleration stages of progressively diminishing length according to the progressively diminishing velocity of the ions of preferred mass.

As will be discussed in detail hereinafter, the decelerating analyzer sections 14 and 19 differentially decelerate the ions of different masses emanating from the analyzer section 13 in such a way that ions of a predetermined mass have their energy level reduced to a minimum, the ions of the predetermined mass representing a component of the material or substance being analyzed. As will be understood, the electric field at each of the spaces or gaps between the electrodes 30 acts alternately in the upstream and downstream directions, the field at each interelectrode gap or space acting in the downstream direction during one-half of each cycle of the alternating potential and acting in the upstream direction during the succeeding one-half cycle. Also, the fields in adjacent spaces between the electrodes 30 act in opposite directions at any one instant because of the alternate manner of connection to the alternating potential source. Similar considerations are, of course, applicable to the electric fields in the interelectrode gaps 34 between the tubular electrodes 31 of the analyzer section 19. Thus, stating the principle of the analyzer sections 14 and 19 briefly for the present, ions of the preferred mass entering the sections 14 and 19 in phase with the decelerating alternating potential applied to the respective electrodes 30 and 31 thereof have their energy level reduced to a minimum, all other ions negotiating the analyzer sections 14 and 19 emanating therefrom with higher energy levels, all of which will be discussed in more detail hereinafter. Thus, the various ions, differing in energy in accordance with mass (together with various other charged particles, such as stray ions formed downstream from the ionization chamber 22, secondary electrons emitted from the electrodes 30, 31 and the like), are discharged from the analyzer sections 14 and 19 into the collecting system 15, which will be discussed in detail in the paragraphs which follow.

The ion current or signal developed in the collecting system is a measure of the relative abundance of ions of the predetermined mass. The proportion of the ions of the selected mass to the ions of all masses present in the sample being analyzed may be determined by scanning the entire mass range or spectrum derived from the sample, which may be done, as discussed in more detail hereinafter, by varying the frequency and/or amplitude of the alternating potential applied to the decelerating analyzer section 14, or the decelerating analyzer section 19. As hereinbefore suggested, the ion current resulting in the collecting system 15 may be used to actuate an indicating and recording means, or it may be used to perform a control function, such as to control the proportions of selected molecular components present in the material being analyzed. Such an indicating, recording and/or control means is designated by the numeral 35 in Fig. 1 of the drawings.

The collecting system 15 includes spaced, parallel plates 40 and 41 having in general, a D. C. potential therebetween, as will be apparent from the external connections to the plates 40 and 41, illustrated in Fig. 1 of the drawings, such external connestions being illustrative only. In the particular construction shown in Fig. 1 of the drawings, the plates 40 and 41 are inclined relative to the ion path 16 at an angle of approximately 45°, although other angles may be used.

The ion beam from the analyzer section 14, or the analyzer section 19, enters the space between the plates 40 and 41 through an aperture 40*a* in the plate 40, the ions in the beam having kinetic energies corresponding to their respective masses and ions of the preferred mass having minimum kinetic energy, as hereinbefore discussed. As a result of this kinetic energy spread according to mass, and as a result of the potential difference existing between the plates 40 and 41, the ions of different masses follow different parabolic trajectories, such as the trajectories 42, 43 and 44. As will be apparent, the trajectory 42 may be regarded as one followed by the ions of the predetermined mass since such ions, having a minimum kinetic energy level, are deflected the most by the potential difference between the plates 40 and 41. The trajectories 43 and 44 are illustrative of paths followed by nonpreferred ions having higher kinetic energy levels. A plate or electrode 45 is disposed between and parallel to the plates 40 and 41 with its edge 46 intercepting a selected energy locus, the position of the edge 46 being such that the plate 45 intercepts all ion trajectories except the ion trajectory 42 followed by the preferred ions of minimum energy. Expressed more exactly, if the angle between the parallel plates (40, 41, 45) and the ion path 16 is designated $\theta$, then the plate 45 is so mounted that its edge 46 is located at the "peak" of the parabolic trajectory 42, which also makes the angle $\theta$ with the plate 40 at the point of entrance through the aperture 40*a* and at the point where the trajectory 42 leaves the interplate space through an aperture 40*b*. The potential applied to the plate 45 is so adjusted as not to disturb the uniform field between the plates 40 and 41.

Thus, as the ion beam enters the space between the plates 40 and 41 through the aperture 40*a*, the ions are separated into many parabolic trajectories according to their kinetic energies, the potentials between the plates 40 and 41 being so adjusted by a voltage divider 51 that the trajectory 42 of the ions of minimum energy, i. e., the ions of preferred mass, just clears the edge 46 of the plate 45. The voltage divider 52 provides a voltage between the plates 40 and 45 which is a fixed fraction of the total deflection potential between the plates 40 and 41, this being preset to maintain a uniform field between the plates 40 and 41. Thus, the plate 45 separates the trajectory 42 of the preferred ions from the trajectories, such as the trajectories 43 and 44, of the nonpreferred ions.

An important feature of the collector lies in the focusing property of the uniform electric field between the plates 40 and 41. All ions having a given single kinetic energy value which enter through the aperture 40*a*, regardless of their lateral position within the width of the beam 16, describe parabolic paths of equal maximum departure from the plate 40, or attain equal maximum "altitudes" with respect to this plate. A straight line envelope is formed by the tops of the parabolic paths of ions of this single energy, which line is parallel to the plates 40 and 41. At the point of maximum departure or altitude from the plate 40, for the particular parabola described by a particle through the center of the aperture 40*a*, the beam width is extremely small in a direction perpendicular to the plate 40, compared to beam width measured across the aperture 40*a*, assuming the beam width is appreciably smaller than the peak altitude of the parabolas from the plate 40. An effective segregation of the particles of preferred mass is accomplished because the beams of different mass (having different energies) coming out of the R. F. analyzer section may be completely separated spatially in the region of best focus in the neighborhood of the edge 46, only the preferred beam falling below the edge 46, while other beams pass over the blade 45. Complete spatial separation of the discrete beams of different mass is aided by directing into the collector 15 via the aperture 40*a* a reasonably narrow and well collimated beam.

The ions of minimum energy, i. e., the ions of selected mass, after passing through the aperture 40*b* in the plate 40, are intercepted by a collector or collector electrode 49 to produce a signal current therein, the collector electrode 49 being connected to the indicating, recording and/or control means 35. Preferably, the preferred ion trajectory 42, before impinging on the collector electrode 49, passes through an electrode 50, to which a small negative potential may be applied by means of the particular circuitry illustrated, so as to prevent secondary electrons and/or negative ions from leaving the collector electrode to cause a false current indication. The collector electrode 49 may also be a closed chamber with only a small entrant aperture therein, as illustrated, to minimize the escape of ions therefrom. The electrode 50 may be an apertured plate, as illustrated, or it may be a grid, or the like.

Returning now to the decelerating analyzer sections 14 and 19 for a discussion of various considerations relating thereto, it will be understood, as suggested earlier, that only ions of the preferred mass which enter either of the decelerating analyzer sections in phase with the alternating potential applied thereto are decelerated to a minimum energy level, the amplitude and frequency of the alternating potential applied determining which ion mass is the preferred one. All particles other than those of the preferred mass which enter either of the analyzer sections 14 and 19 emanate from such analyzer sections with higher kinetic energy levels. The nonpreferred particles are decelerated less than the preferred particles in some instances, are not decelerated at all in other instances, or are accelerated, etc. (A modification of the foregoing remarks is necessary when heavier-than-preferred particles attain a condition of phase stability, as discussed hereinafter.)

As hereinbefore discussed briefly, it will be understood that the electric field in each of the interelectrode gaps or spaces acts alternately in the upstream and downstream directions, the field in each interelectrode gap or space acting in the downstream direction during one-half of each cycle of the alternating potential and acting in the upstream direction during the succeeding one-half cycle.

In the analyzer section 14, which employs thin apertured plates or discs as the electrodes 30, the field in each interelectrode gap or space of course extends the entire distance between the electrodes, i. e., substantially the full stage length. However, with tubular electrodes, the electric field in each interelectrode gap 34 extends into each tubular electrode only as far as about one tube radius, in the sense that at one radius from the interelectrode gap, measured along the axis of the tubes (the axis of the ion beam), the electric field has fallen off to about three-tenths of the maximum field strength prevailing within the gap at any instant of time. In terms of energy lost by a particle in the stage, the particle loses about 90% of this total energy between two points each a distance R from the gap center, if a fixed potential is assumed during transit through the stage.

Figure 3:
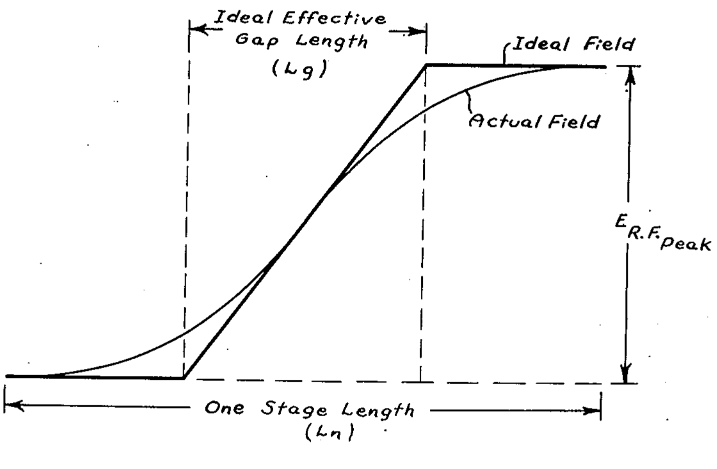
Fig. 3 is a diagrammatic view comparing the actual and idealized decelerating fields applied to ions throughout one stage length in the analyzer section illustrated in Fig. 2 of the drawings.

Referring to Fig. 3, applicable for the tubular case, the distance $L_g$, the effective gap length, may be defined by the distance between two points at which the particle has lost respectively just 5% and 95% of its total energy loss for the stage, assuming a fixed difference of potential, $E_{RF_{PEAK}}$, is impressed across the two tubes. The effective gap length $L_g$, is therefore nearly equal to 2R. The actual axial field between two tubes is shown curved and the ideal axial field is shown with straight line segments. The idealized field aids in the discussion of Figs. 4 to 6, because it enables us to draw well-defined regions of time in which the field between the tube gaps acts on the particle and other regions of time in which it does not. It will be important to note that with parallel plates or discs the particle is substantially continuously acted on by the electric field, but that with tubes it is not.

In order to consider the analyzer structures 14 and 19 with greater exactness, it is necessary to define what we mean by a stage length. The stage length of the $n$th stage, $L_n$, is defined as the distance in which the preferred particle travels during a half-cycle of the R. F. waveform at its time-average velocity in this $n$th stage, $v_n$. The stage is centered about the point of symmetry, within the gap, of the electrostatic field along the beam axis. For the plates 30, the stage length $L_n$ is simply the distance between the plates adjoining the $n$th R. F. gap. Fig. 3, on the other hand, shows a typical stage length L for the tubular electrodes 31, as well as the effective gap length $L_g$. We may represent the extent to which the electrostatic field extends over the stage by the ratio $L_g/L$, which we designate the effective fractional gap length. We note, therefore, that for plates, $L_g=L$, and for tubes, as stated earlier, that $L_g \sim 2R$.

The velocity in any stage changes by less than about 10% for instruments we have built. For such small percentage-change of velocity per stage, the average velocity, $v_n$, of the ions of preferred mass in the $n$th stage, may be considered to be substantially.

$$v_n=\left[\frac{2e}{m}\left(V_0-\frac{2n-1}{2}E_{RF}\right)\right]^{1/2}$$

where $V_0$ is the D. C. accelerating potential applied to the analyzer section 13 (all ions having $eV_0$ electron volts energy as they enter the analyzer section 14 or 19), $m$ is the mass of the preferred particle, and $e$ is the ion charge carried by the particle. $E_{RF}$ is the effective value of the R. F. wave in any stage and is equal to the maximum value of $$\int_{\frac{-L_n}{2}}^{\frac{+L_n}{2}} \epsilon(x,t)dx$$

the maximum being taken with respect to the phase angle of entrance into the $n$th stage, and with respect to the mass $m$ or mass number, M. $\epsilon(x,t)$ is the instantaneous electric field experienced by an ion at a point $x$ and a time $t$ in the field, and is the result both of the electrostatic field configuration of the electrode structure and the form of the A. C. potential with time. $E_{RF}$ is assumed to be constant for all values of $n$.

The change in stage length down the analyzer section must conform to the change in velocity of the preferred ion if the decrement of energy per stage is to be constant. The stage lengths must be proportional to the average velocity in the respective stages. More exactly, for the electrodes 30 or 31

$$L_n=L_1\left[\frac{2V_0-(2n-1)E_{RF}}{2V_0-E_{RF}}\right]^{1/2}$$

$L_1$ being the first stage length. In the case of plates, values of $L_n$ are plate spacings. For tubes, the tube lengths $l_n$ will be $$l_n=\tfrac{1}{2}(L_n-1+L_n)$$

where $n=1, 2, 3$, etc. The first tube length $l_1$ is not critical because the ions experience the first R. F. field only at the downstream end of $l_1$. The last tubular electrode is similarly not critical as to length since only the upstream end participates in an R. F. field.

In order to maintain constant the decrements of energy suffered by the ions of preferred mass at the various gaps, it is also desirable to maintain geometrical similarity between the fields at all gaps, i. e., to insure that the effective gap length is a constant proportion of the stage length, $L_n$. To this end, an important feature resides in progressively decreasing those lateral electrode dimensions which affect field shape in the same proportion as stage length is diminished. In the case of the tubular electrodes 31, this means progressively decreasing the gap diameters. Similar considerations are applicable to the aperture diameters of the electrodes 30, but if the apertures in the electrodes 30 are small compared to the plate or electrode spacing, and the plates are thin, those portions of the fields which extend into the apertures therein are of negligible length as compared to the plate spacings. Consequently, as a practical matter, the apertures in the electrodes 30 would probably always be made of constant diameter as shown. Thus, the discussion of lateral dimension variations herein is primarily applicable to tubular electrodes.

As will be understood, in the case of the tubular electrodes 31, progressively decreasing the gap diameter causes the decelerating field to extend less deeply into both of the electrodes forming each gap, so that the effective gap length, i. e., the decelerating field length, decreases. This helps insure that each ion of the preferred mass is exposed to the decelerating potential for the same length of time at each one of the gaps in the analyzer section 19 so that it loses equal increments of energy at all of the gaps. This situation is illustrated in Fig 4a of the drawings, wherein an ion of the preferred mass is shown as being exposed to the peak decelerating potential for the same length of time at each of the gaps, the time of exposure to the decelerating field being represented by the widths of the shaded areas 55, 56, etc.

If the diameters of the gaps were not progressively decreased, the time which the particle spends within each of the several decelerating fields would not be constant throughout the entire analyzer section 19. The result of this would be that an ion of the preferred mass would lose more energy from the gaps through which it passed at a higher velocity, assuming it was in the proper phase with the radio frequency wave, since the effective $E_{RF}$ across all the stages would not be the same and the energy difference between a preferred ion and a certain non-preferred ion out of the R. F. analyzer section would be less for a given peak value of R. F. voltage and number of stages than for a comparable system with a constant $E_{RF}$.

The gap diameters are related to the stage lengths by the equation $$L_n=KR_n$$

where R is the radius of the *n*th gap, K is a constant and $L_n$ is the length of one stage (the *n*th), the gaps being at the centers of the stages. From the foregoing equation, it follows that geometrical similarity is maintained between all successive stages, or more specifically that the effective gap length is maintained constantly proportional to stage length, except for the fact that the gap widths (the space between electrodes), in the case of tubes, are themselves preferably kept constant.

Therefore, as long as the lengths of the tubular electrodes 31 decrease as the velocity of the ions of the preferred mass decreases and preferably also as long as the gap radii decrease in the manner discussed above, ions of the preferred mass which enter the first gap in phase with the peak decelerating potential remain in phase throughout the entire analyzer section 19 and experience substantially equal decrements of energy at all of the gaps, which is an important feature of the invention. Similar considerations also apply as long as the spacings of the electrodes 30 decrease as the velocity of the preferred ions decreases. The conditions prevailing under these circumstances are illustrated graphically in Figs. 4*a* and 7*a* of the drawings.

It is important to note that the accelerating section 13 of the analyzer 12 provides each particle with an initial velocity determined by its mass so as to produce a velocity spread according to mass as the particles enter the analyzer section 14 or 19. The use of a high accelerating potential, $V_0$, in the analyzer section 13 to obtain a large velocity spread results in superior mass resolution by the analyzer sections 14 and 19, as well as better focusing of the ion beam, which are important features of the invention. Also, the use of a high value for $V_0$ keeps the average ion velocity high and minimizes the space charge density, which is another important feature.

It might be well to point out that for any particular ion mass, there is a critical relationship among the following variables: amplitude and the frequency of the alternating decelerating potential, the D. C. accelerating potential and the lengths of the first stage, $L_1$, of either of the analyzer sections 14 and 19. This relationship must be satisfied to carry the ions of the preferred mass through the analyzer 12 at the minimum or optimum energy level. According to this relationship, $$M=A\left[\frac{2V_0-E_{RF}}{L_1^2f^2}\right]$$

where M is the mass number of the preferred ion, A is a constant depending upon the units of the quantities in the equation, $E_{RF}$ is the effective radio frequency potential across any radio frequency gap for the preferred ion (see definition previously given), $V_0$ is the D. C. accelerating potential, and $f$ is the frequency of the wave.

Referring to Fig. 4*a* with the foregoing in mind, it will be assumed that a positive ion of the predetermined mass enters the gap between the first electrode 31 and the second electrode 31 when the field at this gap is acting toward the upstream end of the path 16, i. e., when the second electrode 31 is positive relative to the first electrode 31. If the ion of the preferred or predetermined mass enters this first gap in phase with the peak value of the decelerating potential, it loses energy to an extent roughly represented by the shaded area marked "Decelerated" and designated by the numeral 55 in Fig. 4*a*. (Throughout Figs. 4*a* to 8*c*, "A" means accelerated, "D" means decelerated, and "*t*" means time.) The width of the shaded area 55 indicates the time it takes the preferred ion to traverse the effective field at the first gap and corresponds to the ideal effective gap length of Fig. 3. After being decelerated by the potential difference across the first gap, the ion of the preferred mass drifts through the second of the electrodes 31 and arrives at the second gap in phase with the peak potential across this gap. In other words, the ion of the preferred mass arrives at the second gap substantially one-half cycle after entering the first gap so that the third of the electrodes 31 is positive relative to the second electrode 31, whereby the ion of the preferred mass is additionally decelerated as it traverses the field at the second gap, as indicated by the shaded area 56. The same thing occurs at each of the subsequent gaps, the ion of preferred mass suffering an additional decrement of energy as it crosses each gap. Ultimately, the ions of preferred mass pass all the way through the analyzer section 19 in this fashion and have minimum energy upon emerging therefrom.

An ion which is lighter than the preferred ions will pass through the analyzer section 19 with a relatively high energy level, even though it enters the first gap, between the first and second electrodes 31, in phase with the peak decelerating potential. This situation is shown in Fig. 4*b* of the drawings, wherein a lighter-than-preferred ion is shown as losing a quantity of energy represented by the shaded area 57. However, because of the fact that this ion is lighter than the preferred ions, it is not sufficiently decelerated by the decrement of energy suffered at the first gap. Consequently, when it arrives at the second gap, it arrives somewhat ahead of the peak decelerating potential, as indicated by the shaded area 58, and is still farther ahead of the peak decelerating potential by the time it arrives at the third gap, as indicated by the shaded area 59. By the time it arrives at the fourth gap, or some other gap number, it may be so far ahead of the peak decelerating potential that it is actually subjected to an accelerating potential for at least part of the time that it takes it to cross the field at such gap so that it begins to gain energy, this being indicated by the split shaded area 60. Consequently, such a light particle will ultimately reach the collecting system 15 with a much higher kinetic energy level than the preferred particle.

Similarly, a particle having a mass greater than the preferred mass loses too much energy at the first gap, especially if it arrives in phase with the peak decelerating potential. Consequently, such a heavier ion falls behind the peak decelerating potential at the second gap, and falls progressively farther behind as it traverses each of the fields at the succeeding gaps. Ultimately, the excessively heavy particle may actually be accelerated so that it also arrives at the collector with an appreciably higher energy level than the preferred ions.

The foregoing considerations are modified if a heavier-than-preferred particle attains a phase-stable condition, as will be described hereinafter (it being impossible for a lighter-than-preferred particle to attain phase stability in the deceleration system described herein).

Figs. 5*a* and 5*b* correspond to Figs. 4*a* and 4*b*, respectively, with a square wave applied to the electrodes 31 instead of a sine wave, and Figs. 6*a* and 6*b* respectively correspond to Figs. 4*a* and 4*b* with a pulse-type waveform substituted for the sine wave. Similarly, Figs. 7*a* and 7*b* correspond to Figs. 4*a* and 4*b*, respectively, except that they relate to the apertured-plate electrodes 30, instead of the tubular electrodes 31, sine waves being applied in both instances. Figs. 8*a* and 8*b* correspond to Figs. 5*a* and 5*b*, respectively, except that they pertain to the apertured-plate electrodes 30 instead of the tubular electrodes 31, square waves being applied in both instances. It will be noted that, in the figures pertaining to the apertured-plate electrodes 30, the entire area under each half cycle is shaded since, as hereinbefore indicated, the effective gap length is substantially equal to the stage length, $L_n$, so that each particle is subjected to deceleration and/or acceleration throughout each entire half cycle. The vertical lines superimposed on the waveforms in Figs. 7*a* to 8*c* denote the times at which the particular particles under consideration pass the corresponding apertured-plate electrodes 30. It will be noted that there is no set of figures for the apertured-plate electrodes 30 corresponding to Figs. 6*a* to 6*c* for the tubular electrodes 31. This is for the reason that the apertured-plate electrodes 30 cannot utilize the critical effect of short pulses for high resolution. There seems therefore to be no particular advantage in using a pulse-type waveform with the apertured-plate electrodes 30. The advantage of a pulse-type waveform with the tubular electrodes 31 is discussed in more detail hereinafter.

Considering the phase-stable phenomenon for heavier-than-preferred particles (alluded to earlier herein), under certain conditions of gap length and R. F. waveform, such particles tend to seek a place on the radio frequency wave such as to enable them to cross successive gaps 180° apart. Thus, they pass through all of the gaps while losing substantially the same amount of energy at each gap, an energy loss which is somewhat less than the peak energy loss being suffered by the preferred-mass particles. The tendency for such particles heavier than the preferred ones is to attain the same velocity as the preferred particles, or to lose an amount of energy in the whole analyzer section 14, or 19, proportional to their mass, the kinetic energy, $V_H$, of such phase-stable, heavy particles lost in section 14, or 19, being given by the equation $$V_H=\frac{m_H}{m_P}V_P$$

where $V_P$ is the energy loss of the preferred particle from all the gaps of the analyzer section 14, or 19, and $m_H$ and $m_P$ are the masses of the heavy and preferred particles, respectively. This effect becomes more or less pronounced depending on the number of stages. In the case of plates, phase stability of heavier-than-preferred particles occurs substantially independently of variations in waveform. In the case of tubes however, the extent to which heavier-than-preferred particles are phase-stable depends on the effective fractional gap length and the wave shape. These factors will be discussed in turn.

As $L_g/L$, the effective fractional gap length, is made smaller, fewer heavier-than-preferred particles are in a phase-stable condition for a tube 10 with a given number of radio frequency stages. Because resonance at a phase-stable position on the radio frequency cycle is never exactly achieved, the heavy particle oscillates about the phase-stable position on the cycle, one such oscillation perhaps occupying a number of stages for its completion. This oscillation may be wider in phase than the phase angle represented by the peak, or nearly peak, portions of the radio frequency waves in Figs. *4a* to *6c*, inclusive. Each of the shaded portions represents effectively the transit angle corresponding to the particles crossing the corresponding effective gap length. As $L_g/L$ is made progressively smaller by reducing all the radii of the electrodes 31, and/or by increasing the lengths of the stages, it becomes more probable that the oscillation about the phase-stable position will carry the particle, in a few stages, into a region of the radio frequency cycle where it will not even lose energy corresponding to the reduced velocity $V_H$, mentioned above, provided the transit angle spans all or nearly all of the non-zero portion of the waveform. Referring to Fig. *6c*, a heavy particle is assumed to be crossing gaps in a region of the cycle where the process is in a steady state, or phase-stable, but imagine that the particle in the first several radio frequency stages is retarded or accelerated because of entry into the first stage at a phase substantially different from that of Fig. *6c*. The particle will have to oscillate or move to the phase-stable position on the radio frequency waveform, and if the amount it must move is smaller than the angle represented by the width of the region of radio frequency peak value, it is likely to stay in oscillation about the position represented in Fig. *6c*. But if it must move a phase distance which is appreciable compared to the width of the peak value of the cycle, it may fall out of step with the waveform.

The waveshape employed has an effect on the degree to which a tubular-electrode system operates in a phase-stable manner, for any given number of stages. The analyzer section 19, for example, tends to exhibit phase-stable operation for ions heavier than the preferred, but the permissible angle range of phase oscillation is determinative of the extent to which the phase-stable condition applies to all the heavy ions in the analyzer. More or less all particles heavier than the preferred particles are finally in phase stability at the downstream end of the analyzer, depending on the ratio $L_g/L$ and the shape of the waveform. Figs. *4c*, *5c*, and *6c* show several possibilities of deceleration for a practical value of $L_g/L$ and different waveforms.

In the case of plates, typical conditions of phase-stable operation for heavier-than-preferred particles are shown in Figs. *7c* and *8c*. These correspond to Figs. *4c* and *5c* respectively, illustrating the tubular case.

Fig. *6c* indicates that the possible phase angle of oscillation is smaller with the pulse wave than with the sine wave, Fig. *4c*, and that with the sine wave, Fig. *4c*, it is smaller than with the square wave, Fig. *5c*. This permissible range determines how many of the heavy particles are phase stable at the downstream end of the tubular analyzer section. The energy separation between the preferred particle and a heavier particle is greater if that heavier particle has lost the resonance velocity, i. e., slipped out of phase stability. The fewer heavy particles in phase stability, the better the resolution.

It is desired that the transit angle across the effective gap length be less than the pulse width of the wave with a pulse-type waveform in order to use the critical effect of short pulses to obtain high resolution. Thus, with tubular electrodes 31, the transit angle may be made as small as desired by making $L_g/L$ small, i. e., using small ratio of gap radius to tube length. The apertured-plate electrodes 30 are incapable of utilizing the critical effect of short pulses, as hereinbefore mentioned.

In general, we have found that square wave operation gives increased current for comparable resolution over sine wave operation, because the acceptance phase is not as critical (see Figs. *4a*, *5a*, *6a*, *7a* and *8a*). Increasing $L_g/L$ and keeping the waveshape a pulse of length of the order of the transit angle of the gaps improves resolution. However, this decreases the resulting ion current, I, as $$I\sim\frac{L_g}{L}$$

In scanning the mass resolving device of the present invention by varying the frequency, for example, the mass peaks, i. e., ion current peaks in the collecting system 15, may appear triangular with very sharp tops. This means the indicating or control means 35 must be very rapid in order to respond fully to the peak values of the mass curves. The sharpness of the peak seen on a recording device may be decreased by frequency modulating the radio frequency wave with a smooth waveform, as a sine waveform, using a frequency modulator connected as shown at 65, for example. The selected modulation frequency is low compared to that of the basic R. F. wave, but high with respect to the response time of any indicating device used to register the mass peaks.

The indication given by the means 35 at any mass position is then a time average, taken over the modulation cycle, of a large number of readings immediately in the neighborhood of the given mass position. The averaging or integrating effect of a smooth modulating waveform accordingly is to convert the sharp top to a rounded one, changing the position of the maximum value but slightly with respect to mass position or amplitude if the fractional change of frequency is made small. The fractional frequency change needs be only large enough to allow the recording or control instrument 35 time to respond substantially fully to the peak signal value before the signal amplitude derived from the collecting system 15 again decreases.

In the case of a system where the mass peaks without modulation are straight sided and symmetrical about the maximum on the mass scale, the modulating waveform (that is, the radio frequency as a function of time) may be a square wave, so that the radio frequency oscillator is changed step-wise. The resulting peak shape on the mass scan is then a flat topped waveform, which is desirable.

If frequency is varied to provide mass scanning, then the preferred particle has a constant energy as the mass range is scanned, and the paths for ions of different masses in the collecting system 15 are the same paths 42, 43, 44 as each becomes, in turn, the preferred particle in the frequency scan, so that no change of geometry is necessary in the scanning of different masses.

Although we have disclosed exemplary embodiments of our invention herein for purposes of illustration, it will be understood that various changes, modifications and substitutions may be incorporated in such embodiments without departing from the spirit of the invention.

We claim as our invention:

1. In a mass spectrometer, the combination of: an ion source; accelerating means for accelerating ions from said source along an ion path; analyzer means on said path downstream from said accelerating means for selectively and progressively decelerating said ions in spaced regions along said path according to the respective masses thereof so as to provide those ions of a selected mass with a minimum kinetic energy along said path; and ion collecting means at the downstream end of said path for collecting said ions of selected mass.

2. In a mass spectrometer, the combination of: an ion source; accelerating means for accelerating ions from said source along an ion path; radio frequency analyzer means on said path downstream from said accelerating means for selectively and progressively decelerating said ions according to the respective masses thereof so as to provide those ions of a selected mass with a minimum kinetic energy along said path; and ion collecting means at the downstream end of said path for collecting said ions of selected mass.

3. In a mass spectrometer, the combination of: an ion source; accelerating means for accelerating and focusing ions from said source along an ion path; analyzer means on said path downstream from said accelerating means for selectively and progressively decelerating said ions in spaced regions along said path according to the respective masses thereof so as to provide those ions of a selected mass with a minimum kinetic energy along said path; and ion collecting means at the downstream end of said path for collecting said ions of selected mass.

4. In a mass spectrometer, the combination of: ionizing means for ionizing a sample substance to produce ions thereof; accelerating means for accelerating said ions along an ion path; A. C. analyzer means on said path downstream from said accelerating means for selectively decelerating said ions along said path according to the respective masses thereof so as to provide those ions of a selected mass with a minimum kinetic energy along said path; and ion collecting means at the downstream end of said path for separating said ions of selected mass from other charged particles and for collecting said ions of selected mass.

5. In a mass spectrometer, the combination of: ionizing means to produce ions; accelerating means for accelerating said ions along an ion path; analyzer means on said path downstream from said accelerating means for selectively and progressively decelerating said ions along said path according to the respective masses thereof so as to provide those ions of a selected mass with a minimum kinetic energy along said path, said analyzer means including an array of electrodes spaced to provide a series of deceleration stages of progressively diminishing length along said path according to the progressively decreasing velocity of said ions of selected mass, and including an alternating potential source connected to said electrodes for providing adjacent electrodes in said array with alternatingly opposite polarities; and ion collecting means at the downstream end of said path for collecting said ions of selected mass.

6. In a mass spectrometer, the combination of: ionizing means to produce ions; accelerating means for accelerating said ions along an ion path; analyzer means on said path downstream from said accelerating means for selectively and progressively decelerating said ions in stages along said path according to the respective masses thereof so as to provide those ions of a selected mass with a minimum kinetic energy along said path, said analyzer means including a linear array of electrodes spaced to provide a series of deceleration stages of progressively diminishing length along said path according to the progressively decreasing velocity of said ions of selected mass, and including an alternating potential source connected to said electrodes for providing adjacent electrodes in said linear array with alternatingly opposite polarities; and ion collecting means at the downstream end of said path for collecting said ions of selected mass.

7. In a mass spectrometer, the combination of: ionizing means for ionizing a sample substance to produce ions thereof; accelerating means for accelerating said ions along an ion path; analyzer means on said path downstream from said accelerating means for selectively and progressively decelerating said ions along said path according to the respective masses thereof so as to provide those ions of a selected mass with a minimum kinetic energy along said path, said analyzer means including an array of electrodes spaced to provide a series of deceleration stages of progressively diminishing length along said path according to the progressively decreasing velocity of said ions of selected mass, and including an alternating potential source connected to said electrodes for providing adjacent electrodes in said array with alternatingly opposite polarities; and ion collecting means at the downstream end of said path for separating said ions of selected mass from other charged particles and for collecting said ions of selected mass.

8. In a mass spectrometer, the combination of: ionizing means for ionizing a sample substance to produce ions thereof; a sample-introducing leak communicating with said ionizing means for introducing the sample substance into said ionizing means to be ionized therein; accelerating means for accelerating said ions along an ion path; analyzer means on said path downstream from said accelerating means for selectively and progressively decreasing the velocity of said ions along said path according to the respective masses thereof so as to provide those ions of a selected mass with a minimum kinetic energy along said path, said analyzer means including an array of electrodes spaced to provide a series of deceleration stages of progressively diminishing length along said path according to the progressively decreasing velocity of said ions of selected mass, and including an alternating potential source connected to said electrodes for providing adjacent electrodes in said array with alternatingly opposite polarities; and ion collecting means at the downstream end of said path for collecting said ions of selected mass.

9. In a mass spectrometer, the combination of: means at the upstream end of an ion path for directing a beam of ions of different masses down said path; analyzer means on said path downstream from such means for selectively and progressively decelerating said ions in stages along said path according to the respective masses thereof so as to provide those ions of a selected mass with a minimum kinetic energy along said path, said analyzer means including an array of electrodes spaced to provide a series of deceleration stages of progressively diminishing length along said path according to the progressively decreasing velocity of said ions of selected mass, and including an alternating potential source connected to said electrodes for providing adjacent electrodes in said array with alternatingly opposite polarities, said electrodes in said array having lateral dimensions which affect the field acting on said ions and which progressively decrease along said path in proportion to the progressively decreasing length of said stages along said path; and ion collecting means at the downstream end of said path for collecting said ions of selected mass.

10. In a mass spectrometer, the combination of: ionizing means at the upstream end of an ion path for ionizing a sample substance to produce ions thereof; accelerating means for accelerating said ions along an ion path; analyzer means on said path downstream from said accelerating means for selectively and progressively decelerating said ions along said path according to the respective masses thereof so as to provide those ions of a selected mass with a minimum kinetic energy along said path, said analyzer means including a linear array of apertured plates located progressively closer together along said path according to the progressively decreasing velocity of said ions of selected mass, and including an alternating potential source connected to said apertured plates for providing adjacent plates in said array with alternatingly opposite polarities; and ion collecting means at the downstream end of said path for collecting said ions of selected mass.

11. In a mass spectrometer, the combination of: ionizing means at the upstream end of an ion path for ionizing a sample substance to produce ions thereof; accelerating means for accelerating said ions along an ion path; analyzer means on said path downstream from said accelerating means for selectively and progressively decelerating said ions along said path according to the respective masses thereof so as to provide those ions of a selected mass with a minimum kinetic energy along said path, said analyzer means including an array of electrodes spaced to provide a series of deceleration stages of progressively diminishing length along said path according to the progressively decreasing velocity of said ions of selected mass, and including an alternating potential source connected to said electrodes for providing adjacent electrodes in said array with alternatingly opposite polarities; spectrum sweeping means for varying a characteristic of the alternating potential provided by said source; and ion collecting means at the downstream end of said path for separating said ions of selected mass from other charged particles and for collecting said ions of selected mass.

12. A mass spectrometer as defined in claim 11 wherein said spectrum sweeping means comprises means for varying the frequency of said alternating potential.

13. A mass spectrometer as defined in claim 11 wherein said spectrum sweeping means comprises means for varying the amplitude of said alternating potential.

14. In a mass spectrometer, the combination of: ionizing means at the upstream end of an ion path for ionizing a sample substance to produce ions thereof; accelerating means for accelerating said ions along an ion path; analyzer means on said path downstream from said accelerating means for selectively and progressively decelerating said ions along said path according to the respective masses thereof so as to provide those ions of a selected mass with a minimum kinetic energy along said path, said analyzer means including a linear array of electrodes spaced to provide a series of deceleration stages of progressively diminishing length along said path according to the progressively decreasing velocity of said ions of selected mass, and including an alternating potential source connected to said electrodes for providing adjacent electrodes in said array with alternatingly opposite polarities; electrostatic deflection means at the downstream end of said path for separating said ions of selected mass from other charged particles; and means for collecting said ions of selected mass.

15. In a mass spectrometer, the combination of: means at the upstream end of an ion path for directing a beam of ions down said path; analyzer means on said path downstream from such means for selectively and progressively decelerating said ions along said path according to the respective masses thereof so as to provide those ions of a selected mass with a minimum kinetic energy along said path; electrostatic deflection means at the downstream end of said path for separating said ions of selected mass from other charged particles; and means for collecting said ions of selected mass.

16. In a mass spectrometer, the combination of: means at the upstream end of an ion path for directing a beam of ions down said path; analyzer means on said path downstream from such means for selectively and progressively decelerating ions along said path according to the respective masses thereof so as to provide those ions of a selected mass with a minimum kinetic energy along said path; electrostatic deflection means at the downstream end of said path for imparting curved trajectories to ions of said beam and for focusing into a predetermined focal region rays of said ions of selected mass which extend along said path; and means in said focal region for segregating said ions of selected mass.

17. A mass spectrometer as defined in claim 16 wherein said electrostatic deflection means comprises a pair of spaced plates charged to a difference of potential and positioned to receive therebetween ion rays which extend along said ion path.

18. A mass spectrometer according to claim 17 wherein said plates are disposed in planes positioned obliquely with respect to said ion path.

19. In a mass spectrometer, the combination of: an ion source at the upstream end of an ion path adapted to direct an ion beam down said path; analyzer means on said path downstream from said ion source for selectively and progressively decelerating ions produced by said ion source along said path according to the respective masses thereof so as to provide those ions of a selected mass with a minimum kinetic energy along said path; and an ion collecting system at the downstream end of said path for separating said ions of selected mass from other charged particles and for collecting said ions of selected mass, including parallel, differently charged plates positioned to receive therebetween an ion beam extending along said path so as to differently deflect ions in said beam in accordance with the respective kinetic energies thereof, and including an electrode in the field between said plates positioned to intercept said beam at a selected energy locus.

20. In a mass spectrometer, an ion collecting system for segregating from an ion beam, which extends along an ion path and which includes ions of different masses having correspondingly different kinetic energies, those ions of a selected mass having a minimum kinetic energy, the combination of: parallel, differently charged plates positioned to receive said ion beam therebetween so as to differently deflect said ions therein in accordance with the respective kinetic energies thereof; and an electrode in the field between said plates positioned to intercept said ion beam at a selected kinetic energy locus so as to intercept ions having kinetic energies exceeding said minimum.

21. A mass spectrometer as defined in claim 20 including another electrode positioned to intercept said ions of minimum kinetic energy, which are not intercepted by the first-mentioned electrode.

22. A mass spectrometer as defined in claim 21 including a measuring device connected to said other electrode.

23. A mass spectrometer as defined in claim 21 wherein said plates are disposed at an oblique angle to said ion path.

24. A mass spectrometer as defined in claim 21 wherein said first electrode extends into said field between said plates in a direction parallel to said plates.

25. A mass spectrometer according to claim 21 including an opening in one of said plates, to provide passage for said ions of minimum kinetic energy, another electrode being positioned with respect to said opening to receive said ions of minimum energy after passage therethrough.

26. In a mass spectrometer, the combination of: means at the upstream end of an ion path for ionizing a sample substance to produce ions thereof and for accelerating said ions down said path; analyzer means on said path downstream from said means for selectively and progressively decelerating said ions along said path according to the respective masses thereof so as to provide those ions of a selected mass with a minimum kinetic energy along said path, said analyzer means including an array of electrodes spaced to provide a series of deceleration stages of progressively diminishing length along said path according to the progressively decreasing velocity of said ions of selected mass, and including a source of nonsinusoidal alternating potential connected to said electrodes for providing adjacent electrodes in said array with alternatingly opposite polarities; and ion collecting means at the downstream end of said path for collecting said ions of selected mass.

27. In a mass spectrometer, the combination of: means at the upstream end of an ion path for directing ions down said path; analyzer means on said path downstream from said means for selectively and progressively varying the velocities of said ions along said path according to the respective masses thereof so as to provide those ions of a selected mass with a minimum kinetic energy along said path, said analyzer means including an array of electrodes spaced to provide a series of deceleration stages of progressively diminishing length along said path according to the progressively decreasing velocity of said ions of selected mass, and including a source of alternating potential connected to said electrodes for providing adjacent electrodes in said array with alternatingly opposite polarities; means for modulating the frequency of said alternating potential; and ion collecting means at the downstream end of said path for collecting said ions of selected mass.

28. In a mass spectrometer, the combination of: ionizing means for ionizing a gas mixture to produce ions thereof; means for maintaining the region occupied by said ionizing means at a reduced pressure; means for admitting the gas mixture into said region from a region of higher pressure; accelerating means for accelerating said ions along an ion path; analyzer means on said path downstream from said accelerating means for selectively and progressively decelerating said ions along said path according to the respective masses thereof so as to provide those ions of a selected mass with a minimum kinetic energy along said path, said analyzer means including an array of electrodes spaced to provide a series of deceleration stages of progressively diminishing length along said path according to the progressively decreasing velocity of said ions of selected mass, and including an alternating potential source connected to said electrodes for providing adjacent electrodes in said array with alternatingly opposite polarities; and ion collecting means at the downstream end of said path for collecting said ions of selected mass.

29. A mass spectrometer providing a path and including: source means at the upstream end of said path for producing charged particles; accelerating means downstream from said source means and on said path for producing a continuous accelerating potential in a direction along said path toward the downstream end thereof so as to accelerate the particles along said path in said direction; decelerating means downstream from said accelerating means and on said path, said decelerating means including a plurality of electrodes spaced apart along said path and having a source of alternating potential connected thereto; and electrostatic deflection means for separating the particles according to kinetic energy, and for collecting those of the minimum energy, at the downstream end of said path.

30. In a mass spectrometer, the combination of: an envelope providing a path; source means in said envelope at the upstream end of said path for producing charged particles; accelerating means in said envelope downstream from said source means and on said path for producing a continuous accelerating potential in a direction along said path toward the downstream end thereof so as to accelerate the particles along said path in said direction; decelerating means in said envelope downstream from said accelerating means and on said path, said decelerating means including a plurality of electrodes spaced apart along said path and having a source of alternating potential connected thereto; and electrostatic focusing means for separating the particles according to kinetic energy, and for collecting those of the minimum energy, at the downstream end of said path.

31. In a mass spectrometer, the combination of: an envelope providing a path; source means in said envelope at the upstream end of said path for producing charged particles; accelerating means in said envelope downstream from said source means and on said path for producing a continuous accelerating potential in a direction along said path toward the downstream end thereof so as to accelerate the particles along said path in said direction; decelerating means downstream from said accelerating means and on said path, said decelerating means being disposed in said envelope and including a plurality of electrodes spaced apart along said path; a source of alternating potential connected to said electrodes for applying thereto an alternating potential of nonsinusoidal waveform; and collecting means in said envelope at the downstream end of said path.

32. In an apparatus of the character described, the combination of: an envelope providing a path; source means in said envelope at the upstream end of said path for producing charged particles; accelerating means in said envelope downstream from said source means and on said path for producing a continuous accelerating potential in a direction along said path toward the downstream end thereof so as to accelerate the particles along said path in said direction; decelerating means in said envelope downstream from said accelerating means and on said path, said decelerating means including a plurality of aligned tubular electrodes spaced apart along said path and having a source of alternating potential connected thereto, said tubular accelerators decreasing in length and diameter from the upstream end of said decelerating means toward the downstream end thereof; and collecting means in said envelope at the downstream end of said path.

33. An apparatus according to claim 32 wherein $L_n = KR_n$, where $R_n$ is the radius of the $n$th gap between each pair of tubular electrodes, where K is a constant and where $L_n$ is the length of the $n$th interelectrode stage, each interelectrode stage extending from the midpoint of one tubular electrode to the midpoint of the next.

34. In a mass spectrometer, the combination of: decelerating means for charged particles including a plurality of electrodes spaced apart along a predetermined path and providing a plurality of decelerating regions spaced apart along said path; and a source of alternating potential connected to said electrodes for applying thereto an alternating potential of nonsinusoidal waveform to progressively and selectively decelerate said particles in said regions according to mass.

35. A spectrometer according to claim 34 wherein said electrodes are tubular and decrease in diameter and length from the upstream end of said path toward the downstream end thereof.

36. A spectrometer according to claim 34 wherein said electrodes are apertured plates.

37. In a mass spectrometer, the combination of: decelerating means for charged particles including a plurality of electrodes spaced apart along a predetermined path and providing a plurality of decelerating regions spaced apart along said path; and a source of alternating potential connected to said electrodes to progressively and selectively decelerate said particles in said regions according to the respective masses thereof.

References Cited in the file of this patent

UNITED STATES PATENTS

| | | |
|---|---|---|
| 2,633,539 | Altar | Mar. 31, 1953 |
| 2,642,535 | Schroeder | June 16, 1953 |